US008483711B1

(12) United States Patent
Mendis

(10) Patent No.: US 8,483,711 B1
(45) Date of Patent: *Jul. 9, 2013

(54) AUTOMATIC PLACE DETECTION

(75) Inventor: Charles Mendis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/556,133

(22) Filed: Jul. 23, 2012

Related U.S. Application Data

(63) Continuation of application No. 12/855,980, filed on Aug. 13, 2010, now Pat. No. 8,233,913.

(51) Int. Cl.
*H04W 24/00* (2009.01)

(52) U.S. Cl.
USPC ............. 455/456.1; 455/456.2; 455/456.3; 455/414.1

(58) Field of Classification Search
USPC ............ 455/412.1, 414.1, 404.2, 414.2, 411, 455/426.2, 432.3, 435.3, 456.1, 456.2, 456.3, 455/456.5, 456.6, 457; 705/14.49, 14.57, 705/14.58, 14.65, 14.66
See application file for complete search history.

(56) References Cited

U.S. PATENT DOCUMENTS

| 7,856,656 | B1 | 12/2010 | Kharvandikar et al. |
| 8,099,109 | B2 | 1/2012 | Altman et al. |
| 2004/0137915 | A1 | 7/2004 | Diener et al. |
| 2006/0046709 | A1 | 3/2006 | Krumm et al. |
| 2007/0032244 | A1 | 2/2007 | Counts et al. |
| 2008/0201763 | A1 | 8/2008 | Lynn et al. |
| 2009/0170482 | A1 | 7/2009 | Alessio et al. |
| 2010/0022255 | A1 | 1/2010 | Singhai |
| 2011/0183732 | A1 | 7/2011 | Block et al. |
| 2012/0022930 | A1 | 1/2012 | Brouhard |
| 2012/0022944 | A1 | 1/2012 | Volpi |
| 2012/0040653 | A1 | 2/2012 | Mendis |
| 2012/0109752 | A1* | 5/2012 | Strutton et al. ............ 705/14.58 |
| 2012/0123867 | A1* | 5/2012 | Hannan ..................... 705/14.58 |

OTHER PUBLICATIONS

International Search Report, PCT/US2011/047550, dated Jan. 17, 2012.

* cited by examiner

*Primary Examiner* — Jean Gelin
(74) *Attorney, Agent, or Firm* — McDermott Will & Emery LLP

(57) ABSTRACT

Systems and methods are provided for obtaining a signature for a place. A server receives information about a place, such as name of the place, from client devices when the devices are at the place, and data related to wireless transmission stations detected by the client devices. The data comprises wireless transmission station identifiers and signal strength information. The server associates the information about the place with the data. Systems and methods are also provided for detecting a place for a client device. The server receives data related to one or more wireless transmission stations detected by the client device when the device is at the place. The data comprises wireless transmission station identifiers and signal strength information. The server compares the set of data with signatures of places, selects a signature based on the comparison, and transmits to the client device information about the place in the selected signature.

20 Claims, 14 Drawing Sheets

AUTOMATIC PLACE DETECTION

REFERENCE TO RELATED APPLICATION

The present application claims priority from and is a continuation of previously filed U.S. application Ser. No. 12/855,980, filed Aug. 13, 2010, the subject matter of which is incorporated herein by reference in its entirety.

BACKGROUND OF THE INVENTION

1. Field of the Invention

The present invention relates generally to location detection systems and methods. More particularly, the present invention relates to characterizing and detecting a place where a client device is located.

2. Description of Related Art

Social location check-in has become increasingly popular these days. Applications, such as Google Buzz or Foursquare, allow mobile device users to automatically or optionally associate present locations with one or more specific places and to post check-in updates to one or more social networking service feeds, such as Twitter, Yelp, Google Buzz etc.

Thus, when a mobile device user comes into a given area, a typical location check-in application will, based on the present location detected by the GPS system and/or A-GPS (Assisted GPS) system on the device, present a list of nearby places and allow the user to check-in at one or more of the places. Users of these applications can add a place to the place/venue database associated with the location check-in services by specifying the location (typically in terms of street address) and the name of the place. If GPS is not available or if the location information is inaccurate, then such location check-in services may not function properly.

SUMMARY OF THE INVENTION

Aspects of invention provide systems and methods of characterizing and detecting a place with Wi-Fi data and user-contributed data to enable accurate check-in of user devices.

In one embodiment of the invention, a method for obtaining an electronic signature for a place is provided. The method comprises receiving, from a plurality of client devices when each of the plurality of client devices is at the place at a respective time. The information about the place includes name information of the place. The method also comprises receiving sets of data related to at least one wireless transmission station detected by respective ones of the plurality of client devices at the place. The sets of data include identifiers of the at least one wireless transmission station and signal strength information of wireless signals transmitted by the at least one wireless transmission station. The method further comprises deriving a pattern of wireless signals from the received sets of data with a processor; associating, by the processor, the information about the place with the derived pattern to generate the signature for the place; and storing the generated signature in a database.

In one example, the information about the place comprises address information of the place.

In another example, the identifiers comprise a MAC address and an SSID of the wireless transmission station.

In a further example, deriving a pattern and associating the information about the place comprises selecting from the received identifiers and signal strength information at least one identifier of respective wireless transmission station and the signal strength information of signals transmitted by the respective wireless transmission station; and associating the information about the place with the selected identifier and signal strength information.

In one alternative, the at least one wireless transmission station comprise one or more Wi-Fi access points.

In another alternative, the method comprises continually collecting data comprising the identifiers of wireless transmission stations detected by client devices at the place and the signal strength information of the wireless signals transmitted by the wireless transmission stations; comparing the generated signature for the place with the collected data; and updating the generated signature for the place based on the comparison.

In a further alternative, the method comprises deriving a pattern of wireless signals from the continually collected data and comparing the generated signature for the place with the derived pattern.

In accordance with another embodiment of the invention, a method of detecting a place is provided. The method comprises receiving, from a client device, a set of data transmitted by at least one wireless transmission station and detected by the client device. The set of data includes identifiers of the at least one wireless transmission station and signal strength information of wireless signals transmitted by the at least one wireless transmission station. The method also comprises comparing the set of data with a plurality of signatures. Each signature is associated with a respective place and indicating a wireless signal pattern of the respective place. Each signature includes name information about the respective place, identifiers of wireless transmission stations and signal strength information of signals transmitted by the wireless transmission stations. The method also comprises selecting a signature based on the comparison; and transmitting to the client device the name information about the place in the selected signature.

In one example, comparing the set of data with the plurality of signatures comprises comparing the identifiers in the set of data with the identifiers in respective ones of the plurality of signatures; and comparing the signal strength information in the set of data with the signal strength information in respective ones of the plurality of signatures.

In another example, selecting a signature based on the comparison includes selecting a signature where its indicated wireless signal pattern correlates to the received set of data.

In accordance with a further embodiment of the invention, an apparatus for obtaining an electronic signature for a place is provided. The apparatus comprises a processor configured for communication with a plurality of client devices and configured to process information received from the plurality of client devices and information to be sent to the plurality of client devices. The apparatus also comprises a memory coupled to the processor. The memory stores instructions executable by the processor. The instructions comprise instructions for receiving, from the plurality of client devices when each of the plurality of client devices is at the place at a respective time, information about the place including name information of the place. The instructions also comprise instructions for receiving sets of data related to at least one wireless transmission station detected by respective ones of the plurality of client devices at the place. The sets of data include identifiers of the at least one wireless transmission station and signal strength information of wireless signals transmitted by the at least one wireless transmission station. The instructions further comprise instructions for deriving a pattern of wireless signals from the received sets of data; associating the information about the place with the derived pattern to generate the signature for the place; and storing the generated signature in a database.

In one example of the apparatus, the information about the place comprises address information of the place.

In another example of the apparatus, the identifiers comprise a MAC address and a SSID of the wireless transmission station.

In a further example of the apparatus, the at least one wireless transmission station comprise one or more Wi-Fi access points.

In one alternative of the apparatus, the instructions for deriving a pattern and associating the information about the place further comprise instructions for selecting from the received identifiers and signal strength information at least one identifier of respective wireless transmission station and the signal strength information of signals transmitted by the respective wireless transmission station; and instructions for associating the information about the place with the selected identifier and signal strength information.

In another alternative, the apparatus also comprises instructions for: continually collecting data comprising the identifiers of wireless transmission stations detected by client devices at the place and the signal strength information of the wireless signals transmitted by the wireless transmission stations; comparing the generated signature for the place with the collected data; and updating the generated signature for the place based on the comparison.

In a further alternative, the apparatus also comprises instructions for deriving a pattern of wireless signals from the continually collected data and comparing the generated signature for the place with the derived pattern.

In accordance with a yet another embodiment of the invention, an apparatus for detecting a place is provided. The apparatus comprises a processor in communication with a client device and configured to process information received from the client device and information to be sent to the client device. The apparatus also comprises a memory coupled to the processor. The memory stores instructions executable by the processor. The instructions comprise instructions for receiving, from the client device when the client device is at the place, a set of data transmitted by at least one wireless transmission station and detected by the client device, the set of data comprising identifiers of the at least one wireless transmission station and signal strength information of wireless signals transmitted by the at least one wireless transmission station. The instructions also comprise instructions for comparing the set of data with a plurality of signatures. Each signature is associated with a respective place and indicating a wireless signal pattern of the respective place, and each signature comprises name information about the respective place, identifiers of wireless transmission stations and signal strength information of signals transmitted by the wireless transmission stations. The instructions further comprise instructions for selecting a signature based on the comparison; and transmitting to the client device the name information about the place in the selected signature.

In one example of the apparatus, the instructions for comparing the set of data with the plurality of signatures comprise instructions for comparing the identifiers in the set of data with the identifiers in respective ones of the plurality of signatures; and comparing the signal strength information in the set of data with the signal strength information in respective ones of the plurality of signatures.

In another example, the instructions for selecting a signature based on the comparison comprise instructions for selecting a signature where its indicated wireless signal pattern correlates to the received set of data.

DETAILED DESCRIPTION

Aspects, features and advantages of the systems and methods will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

In accordance with aspects of the invention, a system for obtaining a signature of a place is provided. The system receives information about a place from client devices when the devices are at the place. The system also receives, from the client devices, data related to wireless transmission stations detected by the client devices. The data comprises wireless transmission station identifiers and signal strength information. The system associates the identifiers and information about the place with the data.

In accordance with further aspects of the invention, a system for detecting for the location of a client device based on signature information is also provided. The system receives data related to one or more wireless transmission stations detected by the client device when the device is at the place. The data comprises wireless transmission station identifiers and signal strength. Here the system compares the set of data with signatures of different places, selects a signature based on the comparison, and transmits to the client device information about the place in the selected signature.

Figure 1:
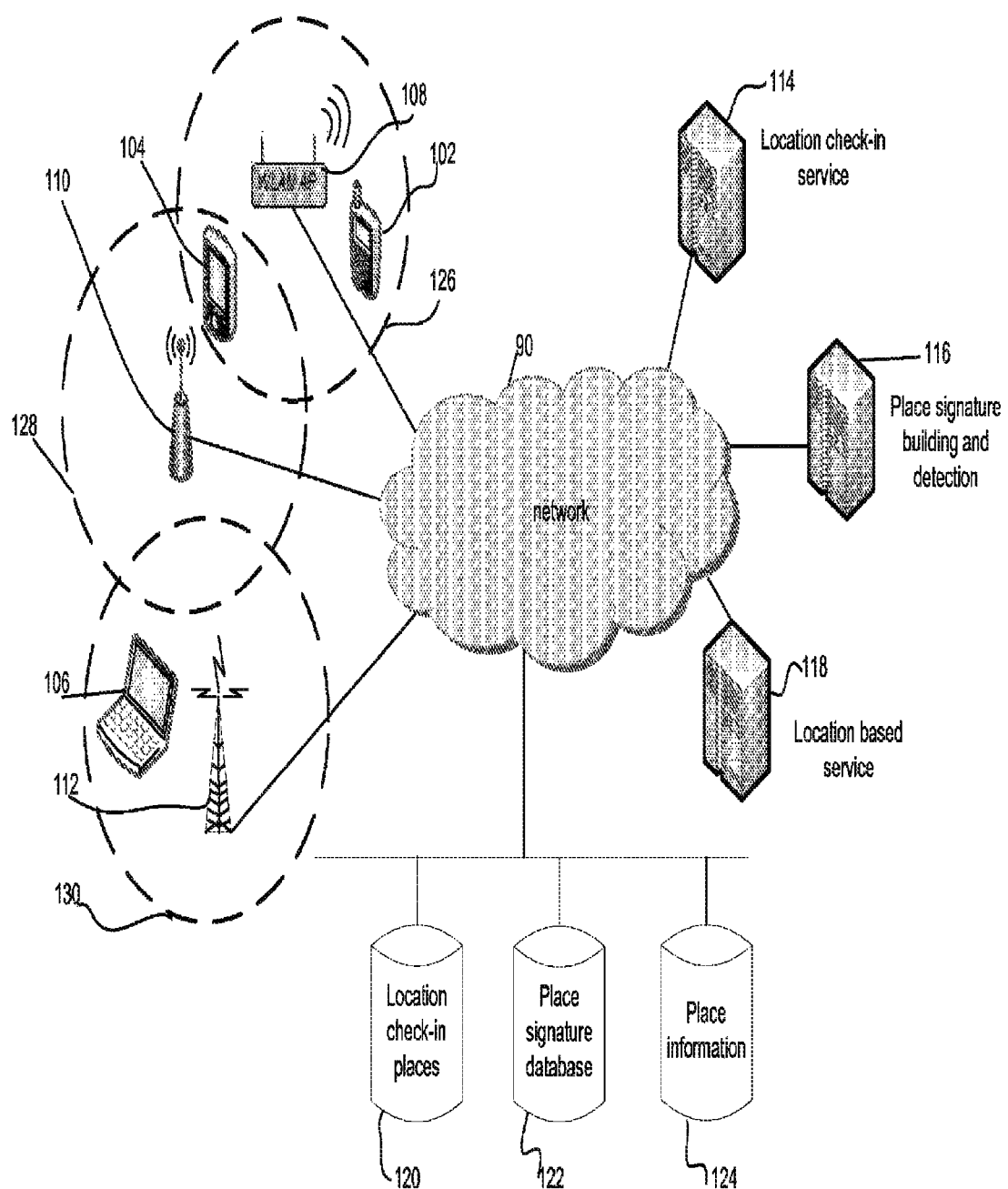
FIG. 1 is a functional diagram of a system in accordance with aspects of the invention.

FIG. 1 illustrates a functional diagram of an exemplary networking operating environment in accordance with aspects of the invention. System 100 may include network 90, wireless network access points 108, 110 and 112, servers 114, 116 and 118, databases 120, 122 and 124, and user devices 102-106.

The user devices may comprise mobile devices capable of wirelessly exchanging data with a server over a network such as the Internet. By way of example only, a user device may be a cellular phone such 102, or a wireless-enabled PDA 104, or a laptop 106 capable of obtaining information via the Internet. The user devices communicate with each other and with other network elements through network 90.

Network 90, and intervening nodes between the servers, databases and the user devices, may comprise various configurations and use various protocols including wide area networks, local area networks, personal area networks, virtual private networks, private networks using communication protocols proprietary to one or more companies, cellular and wireless networks such as 3G, 4G and Wi-Fi networks, and various combinations of the foregoing.

The user devices may receive and send data through various types of wireless transceivers 108-112. For example, transceivers 108-110 may be Wi-Fi access points comprising one or more antennae and a wireless router. Transceiver 112 may be a cellular tower for use in radio access parts of 4G networks such as LTE and Wi-Max, 3G networks such as UMTS, and other wireless networks such as EDGE or CDMA networks. Although only a couple of transceivers are depicted in FIG. 1, it should be appreciated that a typical wireless system can include a large number of antennas, routers, and transceivers.

A user device may be within the coverage area of one or more access points and be able to receive the signals emitted from such access points. For example, as shown in FIG. 1, device 102 is within the coverage range 126 of access point 108, and thus receives signals from the access point 108. Device 104 is within both coverage range 128 of access point 110 and coverage range 126 of access point 108, and therefore receives signals from both these access points 108 and 110. Device 106 is within the coverage range 130 of cellular tower 112.

Other network elements that communicate with the user devices may include the servers 114, 116 and 118. As shown, server 114 may be a computer configured to perform various functions related to location check-in for user devices. Server 116 may be a computer configured to perform functions related to place signature setup and detection. Although only one server for performing place signature setup/detection is depicted in FIG. 1, it should be noted that the various functions related to place signature setup and venue detection may be performed on different servers that are distributed through the network 90.

Server 116 may be connected to one or more distributed databases 120, 122 and 124 through the network 90. For example, database 120 may store places/venues that have registered with location check-in services. Places and venues may include, by way of example, private businesses such as shops, restaurants, real estate owners, and public spaces such as arenas, parks or other recreational areas, museums, and vistas.

Place signature database 122 may include unique signatures built by server 116 for each place. The signatures may be composed of data such as check-in data contributed by a user and access point data received by the user device upon the user's check-in. The access point data is descriptive information of a particular access point and may include signal strength and identifiers of the access points detected by the user device. These databases do not store confidential and private user data transmitted to and from the user device.

Place information database 124 may store various types of venue-related information such as sales, coupons or news or activities associated with a venue, and other types of data for use and/or produced by the location check-in service and venue signature setup and detection service.

The databases 120, 122 and 124 storing the location check-in data, place signatures, and venue information may reside on or be logically associated with the same server. In another example, these databases may reside on distributed servers which may be on different nodes of network 90.

The places detected by server 116 may be used by various location-based service providers to provide location-based services to the user devices over network 90. By way of example, location check-in service 114, which may be an application such as Google Buzz, may automatically snap the present location of the user device with status updates in various types of social networking services, enabling the user to share his/her present location with other people. Instead of automatically checking in the user device, these services may also provide the users with options to check in at the place. In either way, once the device is checked in, the information posted by the user through the application, e.g., Buzz posts, reviews about the place, etc., are tagged with the device's present location. Location-based service provider 118 may provide venue-aware advertising services based on the user device's location, presenting rich venue-related advertisements to the user including coupons and sales activities. Location-based service provider 118 may also provide any other type of location-based services, as well as background aggregate statistical analysis of past locations (e.g., frequented venues, duration of stay, etc.).

Figure 2:
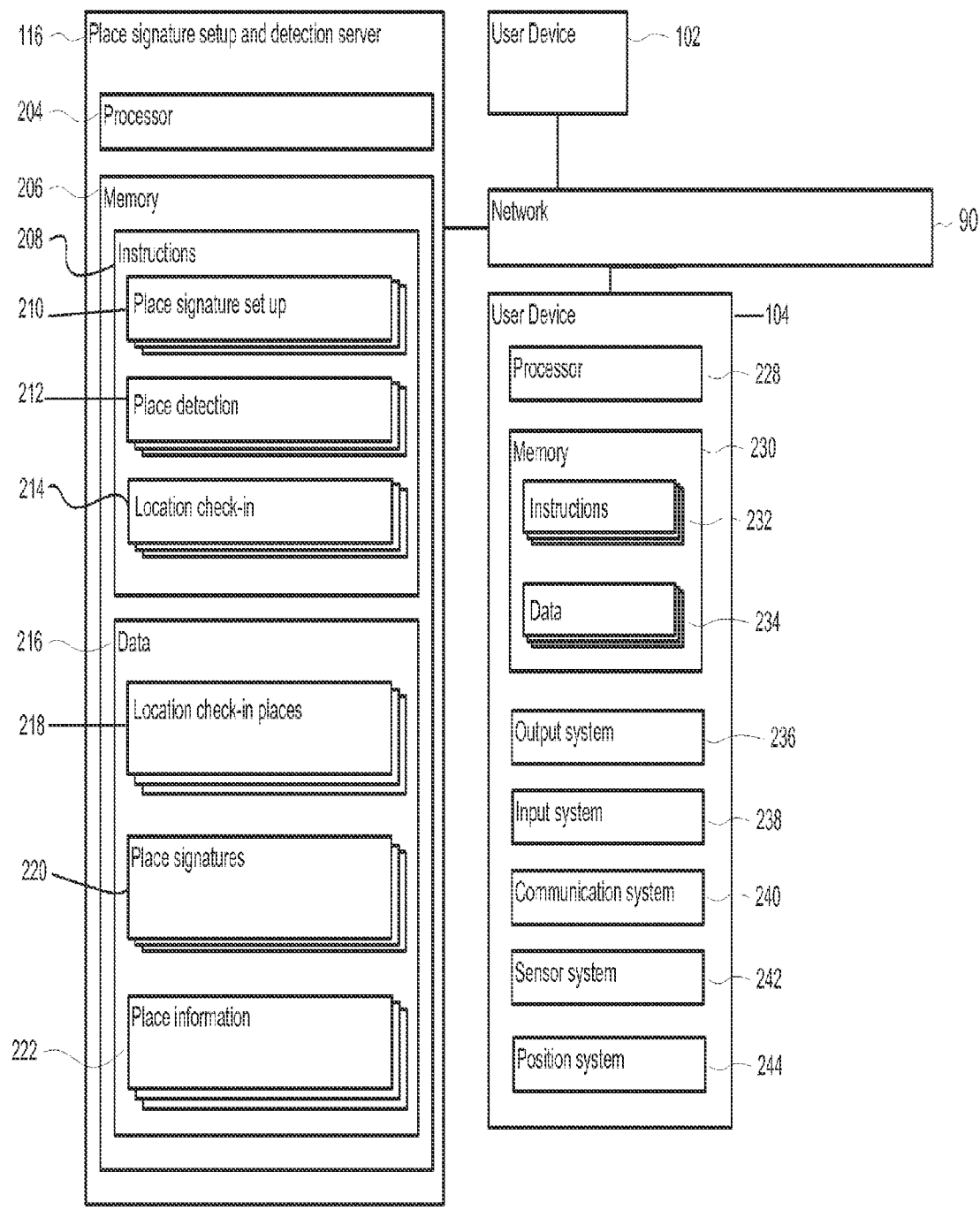
FIG. 2 is another functional diagram of a system in accordance with aspects of the invention.

FIG. 2 illustrates that a venue signature setup and detection server, such as server 116, may contain a processor 204, memory 206 and other components typically present in general purpose computers. The processor 204 may be any conventional processor, such as off the shelf processors from Intel Corporation or Advanced Micro Devices. Alternatively, the processor may be a dedicated controller such as an ASIC.

Memory 206 stores information accessible by processor 204, including instructions 208 that may be executed or otherwise used by the processor 204. It also includes data 216 that may be retrieved, manipulated or stored by the processor. The memory may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

Instructions 208 may be any set of instructions to be executed directly (such as binary machine code) or indirectly (such as scripts from any programming language) by the processor. For example, the instructions may be stored as computer code on the computer-readable medium. In that regard, the terms "instructions" and "programs" may be used interchangeably herein. The instructions may be stored in object code format for direct processing by the processor, or in arty other computer language including scripts or collections of independent source code modules that are interpreted on demand or compiled in advance. Furthermore, methods and routines of the instructions may include, for example, various programs or functions such as venue signatures set up instructions 210, venue detection instructions 212 and location check-in instructions 214.

Data 216 may be retrieved, stored or modified by processor 204 in accordance with the instructions 208. For instance, although the system and method is not limited by any particular data structure, the data may be stored in computer registers, in a relational database as a table having a plurality of different fields and records, XML documents or flat files. The data may also be formatted in any computer readable format such as, but not limited to, binary values or Unicode. The data may comprise any information sufficient to identify the relevant information, such as numbers, descriptive text, proprietary codes, references to data stored in other areas of the same memory or different memories (including other network locations) or information that is used by a function to calculate the relevant data.

Data 216 may store locations for check-in 218, venue signatures 220 and other venue related information 222. As shown in FIG. 1, this data may also be stored in databases 120, 122 and 124 external to the server performing venue signature setup and detection. The venue signatures 220 may comprise the name of a place checked in by the user, and access point data received by the user device when the user performed check-in. The access point data includes signal strength indicators and identifiers of the access points detected by the user device.

A single wireless access point may emit multiple identifiers. By way of example, a Wi-Fi wireless access point may broadcast both a Medium Access Control address, that is, a globally unique number such as a hexadecimal number (e.g., 00:23:32:23:51:AD) assigned by the access point's manufacturer to the individual access point, and a Service Set Identifier ("SSID") that identifies a particular network where the access point resides (e.g., a user may change the access point's default SSID to a text value such as "JoesPizzaWiFi"). The MAC address and the SSID of the same access point may thus be stored as two different AP identifiers. Other access points such as wireless base stations and other wireless transceivers may broadcast other types of identifying information, such as cell tower ID and other cellular network identifications.

By pairing the set of signals and identifiers of the access points detected by the user device with the place check-in data input by the user, a unique signature may thus be built for each place.

In other examples, server 202 may also make use of other data available to help with building signatures, distinguishing one place from another and detecting the place where a user device is. For example, geolocations of the user devices upon performing check-in may also be associated with the detected access point signals, identifiers and the check-in, to approximate a geographical boundary of the place.

The geolocation may be obtained using GPS system or another location mechanism on the user device. Locations may be expressed within the system in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic location (e.g., lot and block numbers on survey maps). Moreover, a location may define a range of the foregoing, such as region or area surrounding a particular geographic position.

Locations may be translated from one reference system to another. For example, the server 116 may access a geocoder to convert a location identified in accordance with one reference system (e.g., a street address) into a location identified in accordance with another reference system (e.g., a latitude/longitude coordinate). In that regard, it will be understood that exchanging or processing locations expressed in one reference system may also be received or processed in other references systems as well.

Available access point coverage ranges and access point location identifiers may also be associated with the place signature building and place access point may be associated identifiers, such as the geographic location or the street address of access point is mounted on.

The access point identification data, e.g., its MAC address, may be linked with location data, e.g., "00:23:32:23:51:AD—300m surrounding (37.423021°,-122.083939°)". The access point's SSID address may also be paired with the street address of the building containing the access point (e.g., "GoogleNet—1600 Amphitheatre Parkway, Mountain View, Calif.").

Although FIG. 2 functionally illustrates the processor and memory as being within the same block, it will be understood by those of ordinary skill in the art that the processor and memory may actually comprise multiple processors and memories that may or may not be stored within the same physical housing. Accordingly, references to a processor or computer will be understood to include references to a collection of processors or computers that may or may not operate in parallel.

The server 116 may be at one node of network 90 and capable of directly and indirectly communicating with other nodes of the network. For example, server 116 may comprise a web service server that is capable of communicating with client devices 102 and 104 via the network 90 such that server 202 uses network 90 to transmit and provide information to a user using client device 226. Server 202 may also comprise a plurality of computers that exchange information with different nodes of a network for the purpose of receiving, processing and transmitting data to the client devices; in this instance, the user devices will typically still be at different nodes of the network than any of the computers comprising server 202.

User devices 102 and 104 may be mobile devices similar to devices 102-106 as described above. Each user device may be configured with one or more processors 228 such as a central processing unit (CPU), memory 230 (e.g., RAM and internal hard drives) and all of the components normally used in connection with a mobile device.

The memory may store instructions 232 and data 234. Instructions 232 may include various sets of instructions executable by the processor 228 and typically found in a mobile device, such as operating system instructions (e.g., Android, Symbian, Windows), phone instructions for handling phone-related processes and functions such as text messaging, graphical user interface instructions, user application program instructions such as a web browser, location instructions for receiving and sending location data, peripheral device instructions to control various input, output and sensor systems on the mobile device, etc. Data 234 may store various types of data accessible by the instructions to facilitate system operations and application executions.

Various peripheral components on the user device 104 are coupled to the processor and the memory through data bus lines and signal lines. Instructions to facilitate the operations of these components are stored in the memory. These peripheral components include output system 236 and input system 238. Output system 236 may comprise an electronic display for visual output (e.g., a small LCD touch-screen or any other electrical device that is operable to display information) and one or more speakers for audio output. Input system 238 may comprise input devices such as keyboard, touch-screen, buttons, thumb-wheel, pointer device, ports (USB, infrared) and/or microphone.

These peripheral components also include communication system 240 to facilitate the user device to communicate with one or more types of networks, such as cellular network, 802.x networks, etc. The communication system may comprise network interface devices and associated controllers or drivers, e.g., transceiver and antenna, as well as all of the components used for connecting these elements to one another.

The user devices may also include sensor system 242 (e.g., infrared sensors) and position system 244. The position system comprises one or more geographic position components to determine the geographic location and orientation of the device. For example, client device 226 may include a GPS receiver to determine the device's latitude, longitude and/or altitude position. The geographic position components may also comprise software for determining the position of the device based on other signals received at the client device 104, such as signals received at the antenna from one or more cellular towers or Wi-Fi access points. The position system may also include an accelerometer, gyroscope or other acceleration device to determine the direction in which the device is oriented. In that regard, it will be understood that a client device's provision of location and orientation data as set forth herein may be provided automatically to the user, to the server, or both.

These devices may be operated in accordance with instructions 232, and the instructions may process data received from these devices. For example, instructions 232 may contain algorithms to estimate the location of user device based on the time of arrival signals from multiple GPS satellites received by the GPS receiver. Instructions 232 may also perform calculations (e.g., triangulation) to estimate device location based on the Wi-Fi access point signals received by the RF antenna when it is determined that GPS signal is not available.

Figure 3:
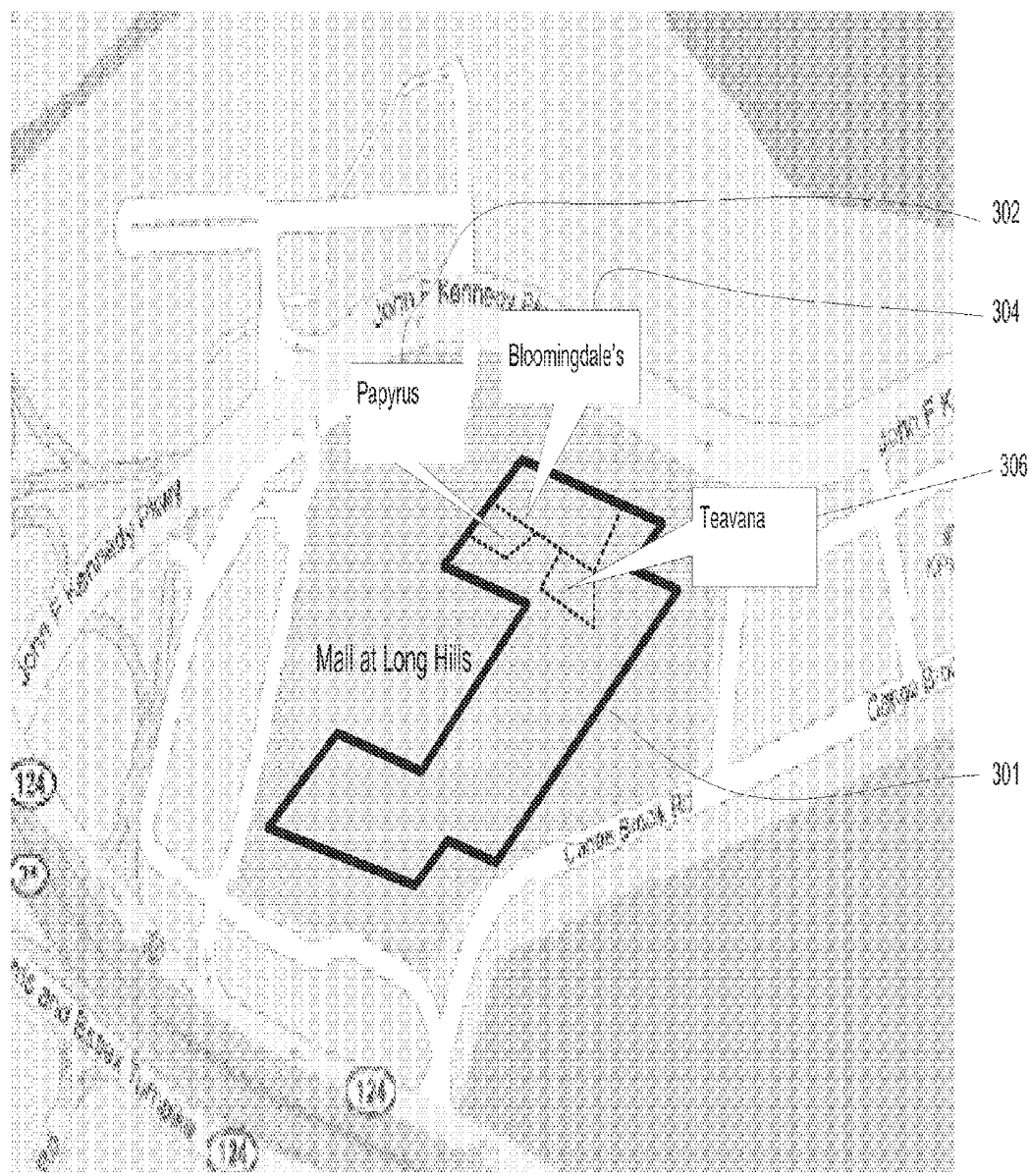
FIG. 3 is an exemplary environment in which aspects of the invention operate.

FIG. 3 illustrates an exemplary environment 300 in which aspects of the invention may operate. As with a typical mall, many places of interests reside in mall 301 ("Mall at Long Hills"). These places may include retail stores, restaurants, beauty salons, etc. For example, at a corner of mall 301, there is a gift store 302 ("Papyrus"), a department store 304 ("Bloomingdale's"), and a gourmet specialty store 306 ("Teavana").

Although FIG. 3 shows an indoor environment, aspects of the invention operate in open space as well as in any environment where wireless network signals are readily detectable by various types of user devices.

Figure 4A:
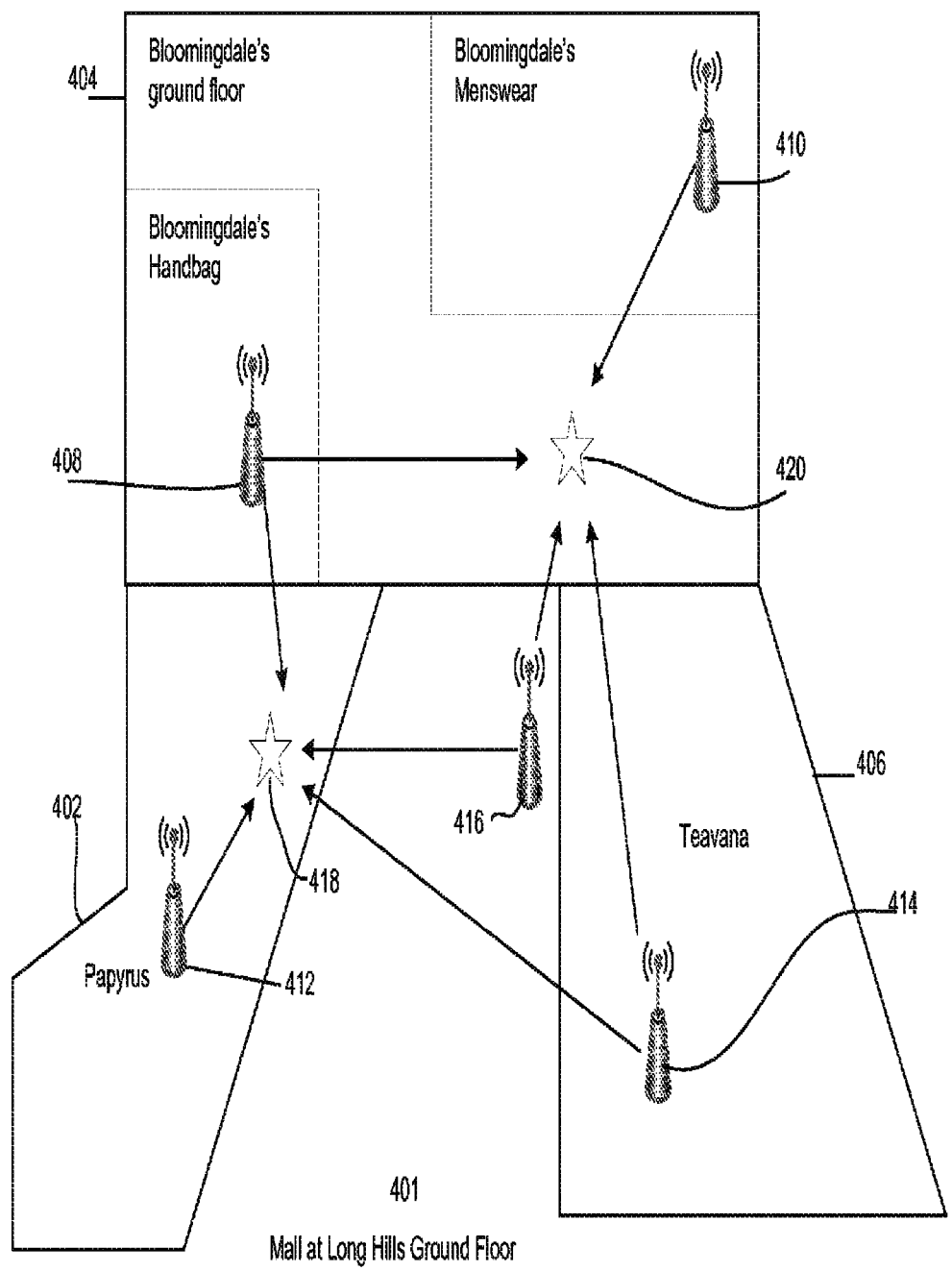
FIGS. 4A-B are exemplary scenarios.

FIG. 4A illustrates an exemplary scenario 400 for environment 300 in accordance with aspects of the invention. As shown, one or more access points may be installed on the mall's ground floor 401 as well as in the venues residing within the mall. These access points provide Wi-Fi service for the patrons of the mall and the venues. For example, gift store 402 may have access point 412 in the store, providing IEEE 802.11 WLAN access to the customers. The number and the location of access points installed in each store may be based on the size, floor plan, as well as the amount of expected traffic and capacity in the store. As shown, department store (place) 404 may have two access points 408 and 410 installed on the ground floor, while gourmet specialty store 406 has only one access point 414. Access point 416 may reside outside the stores 402, 404 and 406, in the corridor of the mall and near the entrances of store 404 and 406.

Referring back to FIG. 1, each access point has an associated coverage range and a particular geo-location may be within the coverage range of one or more access points. In an open space where there is line of sight between a location and an RF transmitter, the falloff in signal strength correlates with an increase in distance and can generally be predicted with a propagation model taking into account various path loss factors. In an indoor environment such as mall 301, RF signal propagation is very much affected by multi-path, where signals propagate from an RF transmitter to receiver via multiple paths, bouncing off walls, furniture and various other surfaces. Thus, a place may be characterized by the RF data presented at the place.

Turning back to FIG. 4A, in scenario 400, a user device may be able to receive signals with different strengths from the access points at a first location. At a different location, the user device may detect a different group of access points, or may detect the same group of access points but with signal strengths different from the first location.

For example, RF signals from access points 408, 412, 414 and 416 may be able to reach location 418. Thus, a user device at location 418 may be capable of detecting access points 408, 412, 414 and 416 during a beam scan. For another example, RF signals from access point 408, 410, 414 and 416 may reach location 420, and therefore, a user device at this location may be able to detect these access points. Although access points 408, 414 and 416 may be detected at both locations 418 and 420. The signal strength detected for these access points may be different at each location.

When a user device at location 420 performs a location check-in through applications such as Google Buzz for place 404, the system may build a signature for place 404 using the check-in data that was input by the user and the Wi Fi data automatically transmitted by the user device. The check-in data may comprise the name of the checked in place. The Wi-Fi data may comprise the list of access points detected by the client device and the strength of the RF signals transmitted by these access points. The detected access points may be identified in the signature by their associated network identifiers, such as MAC address and/or SSID.

Similarly, when a user comes close to location 418 and performs a location check-in for place 402, a signature for place 402 may be obtained with the Wi-Fi data and the check-in data. Thus, each place may be represented by a unique signature of RF signals and access point identifiers.

After a signature has been built for a particular venue, the system may detect if a user device is in the venue by comparing the signature with the Wi-Fi data transmitted by the user device. If there is a high confidence between the signature and the Wi-Fi data from the user device (e.g., the similarity between the two sets of data is above a predetermined threshold or matches a pattern), the system may determine that the user device is within the venue.

Figure 4B:
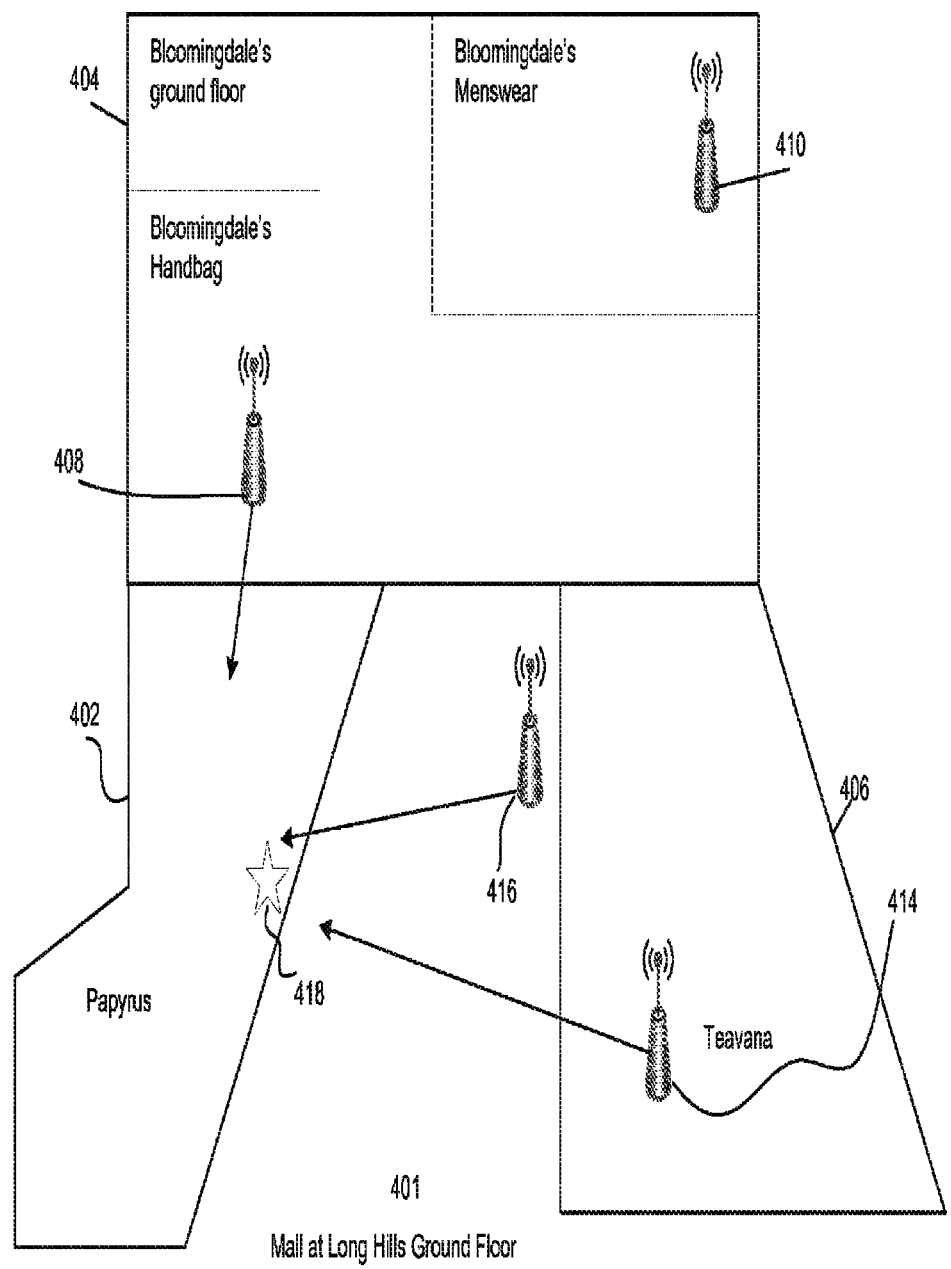

Although FIG. 4A shows a scenario where every venue has an associated Wi-Fi access point, it should be understood that this is not a requirement. Aspects of the invention may also set up signatures for venues without dedicated access points, but within the coverage ranges of one or more access points. FIG. 4B illustrates a scenario 450 where place 402 does not have an access point installed within the place and location 418 is within the coverage ranges of access points 408, 414 and 416. Therefore, when a user performs a location check-in at location 418, indicating the user is currently at venue 402, a signature may also be built for venue 402 with the check-in data and Wi-Fi data detected at location 418. In this scenario, the Wi-Fi data includes identifiers of access points 408, 414 and 416 and their associated RF signal strength. Thus, as in scenario 400, venue 402 may be similarly represented by the RF data detected in the venue.

Figure 5A:
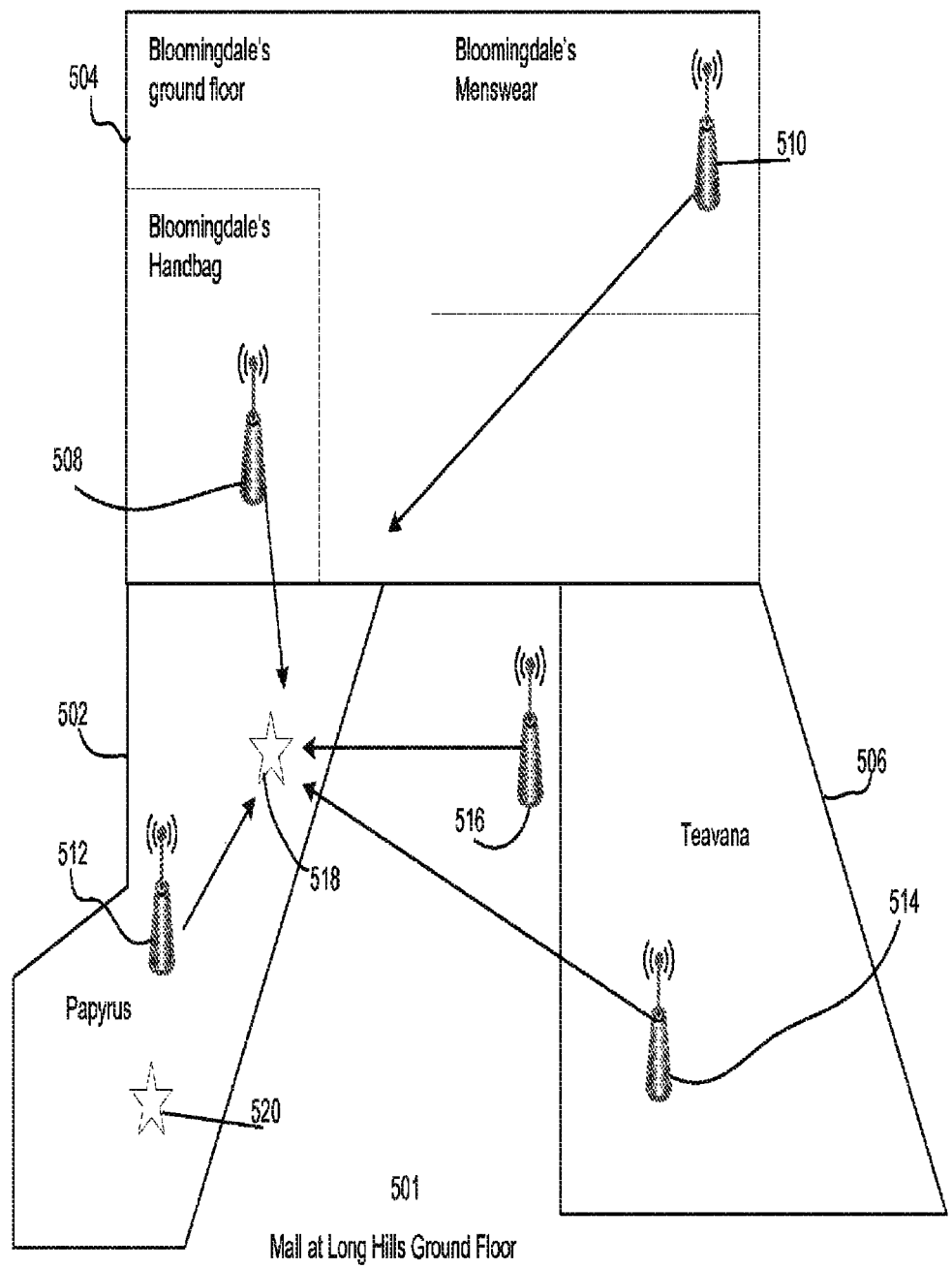
FIGS. 5A-B are further exemplary scenarios.
Figure 5B:
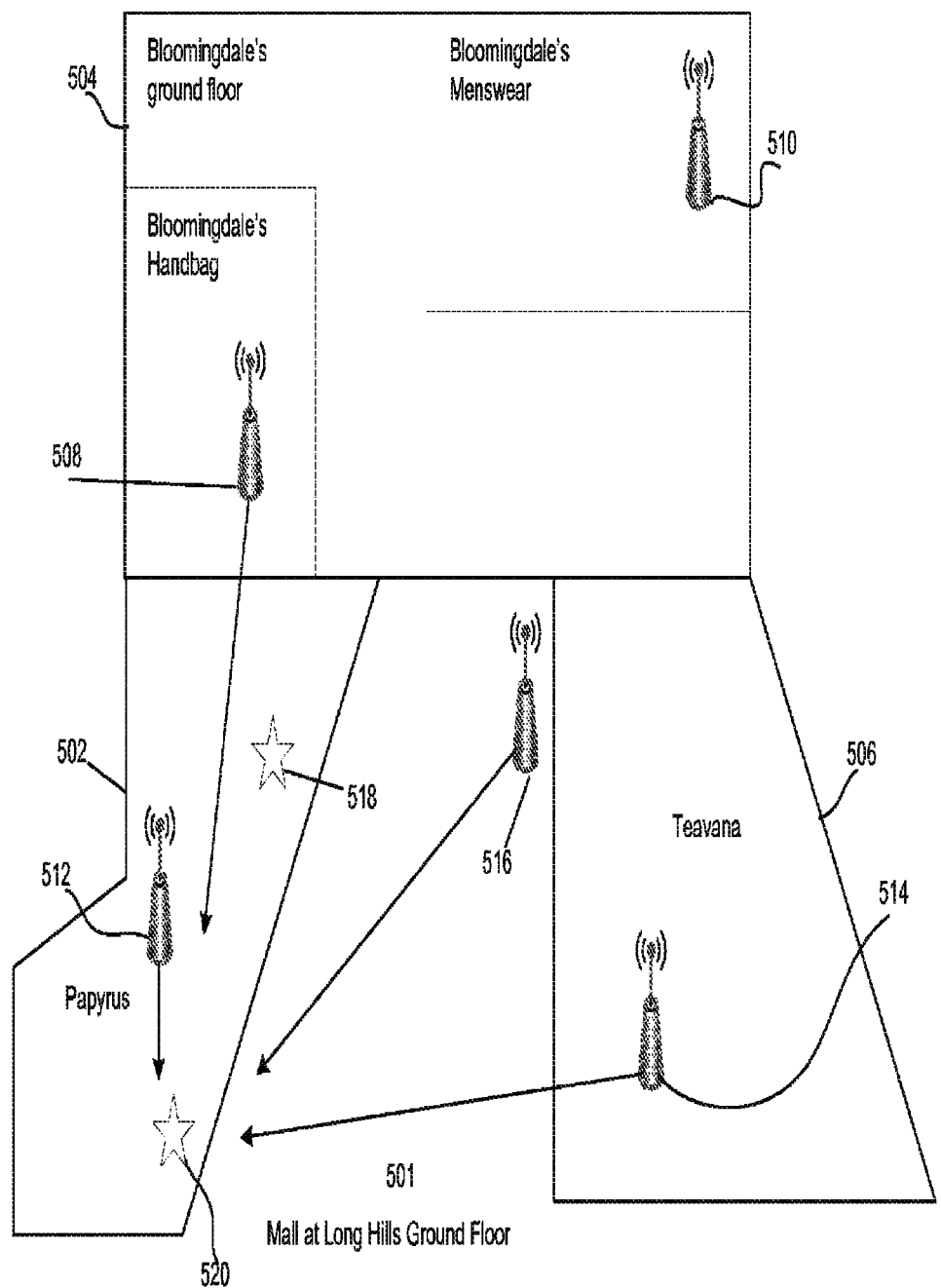

The set of access points and the RF signal strength for the same access point detected by a user device may be different from one location to another within a specific place. Thus, the system may need to collect Wi-Fi data from different locations within a place to build a signature. FIGS. 5A-B illustrate exemplary scenarios 500 and 505, respectively, where Wi-Fi and check-in data are collected for venue 502 ("Papyrus") to set up a signature in accordance with aspects of the invention.

In scenarios 500 and 505, locations 518 and 520 are both within venue 502. At location 518, a user device is able to receive signals from access point 512 mounted in the venue, and access point 514 in venue 506 across from venue 502. The user device also receives RF signals from access point 516 in the corridor of ground floor 501, and access point 508 in adjacent venue 504. The user device may also detect a relatively weak RF signal from access point 510 in venue 504.

The signal from access point 510 gradually fades off from location 518 to location 520. FIG. 5B shows that, at location 520, a user device may still be able to detect signals from access points 508, 512, 514 and 516.

Figure 6A:
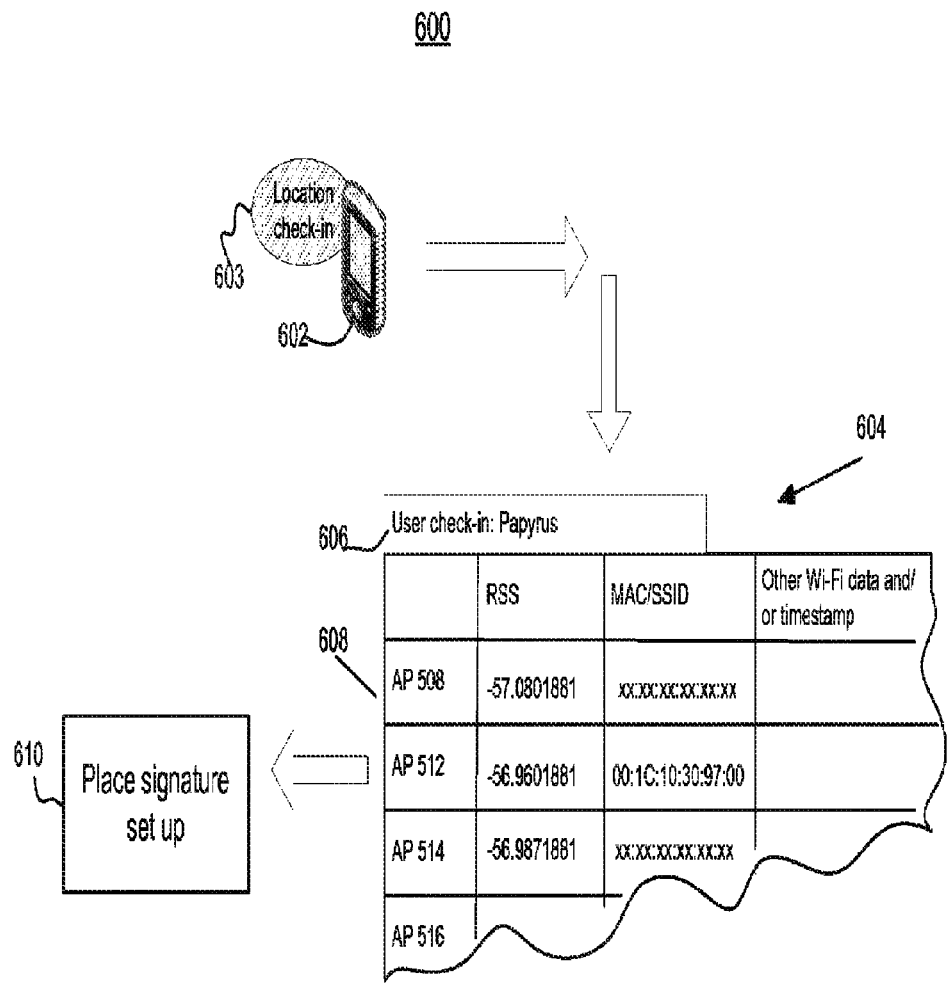
FIGS. 6A-C are function diagrams in accordance with the scenarios in FIGS. 5A-B.

FIG. 6A shows a scenario 600 having exemplary operations performed by a user device at location 518 (see FIG. 5A) in accordance with aspects of the invention. Here, user device 602 runs an application 603 with a location check in feature (e.g., Google Buzz). Typically, the application may present the user with a place name, or a list of nearby places, based on the user's present location, and the user may complete location check-in by selecting place 502 from the list. In another example, the user may manually enter the name of venue 502 to complete check-in if the list of choices does not contain this venue. Depending on the user's configurations of the application, the application may also automatically check in the user. After checking into place 502, the user may be presented with place related information, such as sales and newly arrived products in place 502. The user's posts (e.g., Google Buzz posts), reviews and comments in the application regarding the user's experience with place 502 are thus linked with the place and are visible by others users of the application.

Upon the check-in operation, a set of data 604 is sent to avenue signature set up system 610. Data 604 comprises check-in data 606 and Wi-Fi data 608. Check-in data includes the name of the venue selected or input by the user. Wi-Fi data 608 comprises arrays of access point data, such as RSS and AP identifiers (in the form of MAC and SSID), and or other type of Wi-Fi data. In scenario 600, data 608 includes detected access points 508, 512, 514 and 516, as well as their associated RSS and MAC addresses.

Figure 6B:
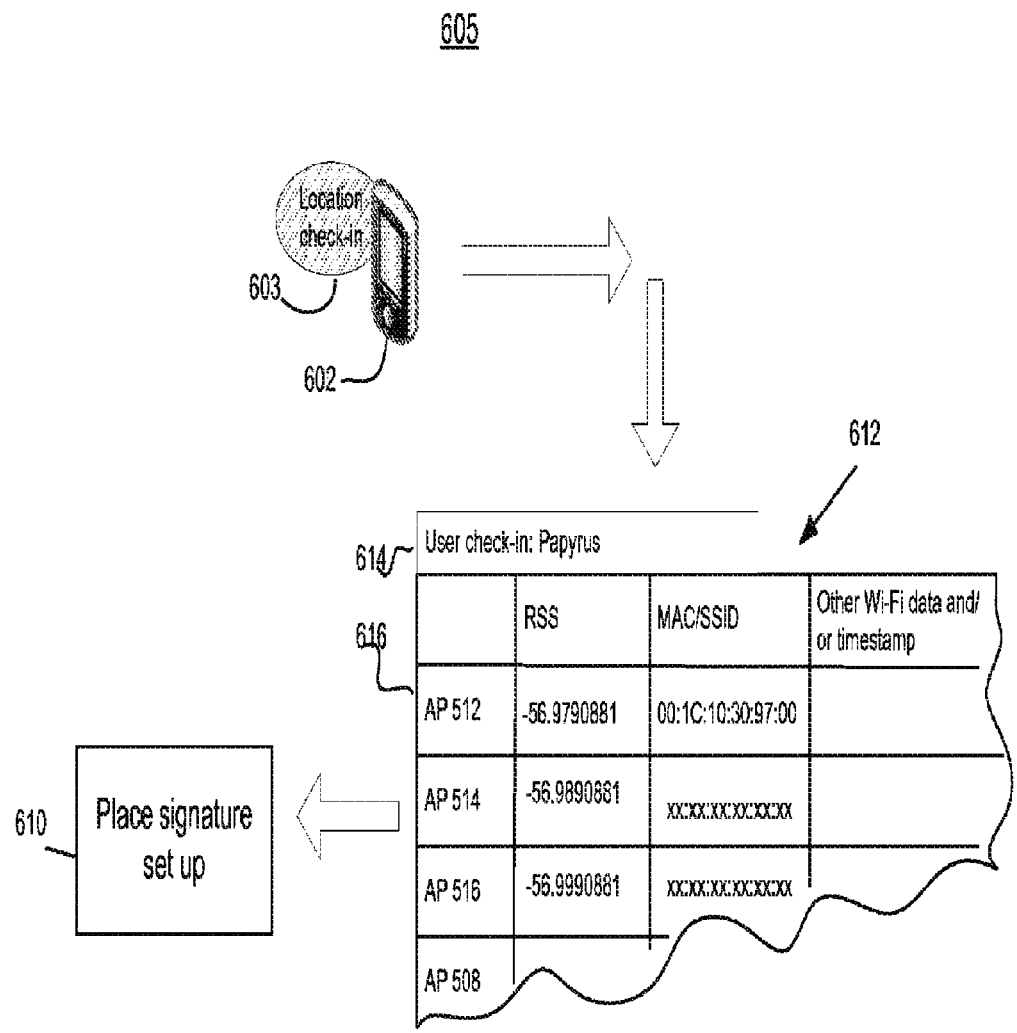

FIG. 6B shows scenario 605 having exemplary operations performed by user device 602 at location 520 in accordance with aspects of the invention. Similar to scenario 600, the user may select from a list of venue choices or manually enter the venue name to check in. Upon the operation, the venue signature set up system receives data 612, which comprises check-in data 614 and Wi-Fi data 616. In scenario 605, Wi-Fi data 616 includes the access points detected by the user device at location 520, e.g., access points 508, 512, 514 and 516, and their associated RSS and MAC addresses. The signal strength for the same access points in Wi-Fi data sets 608 and 616 may be different. For example, signals from access point 508 at location 520 tend to be weaker than at location 518.

Figure 6C:
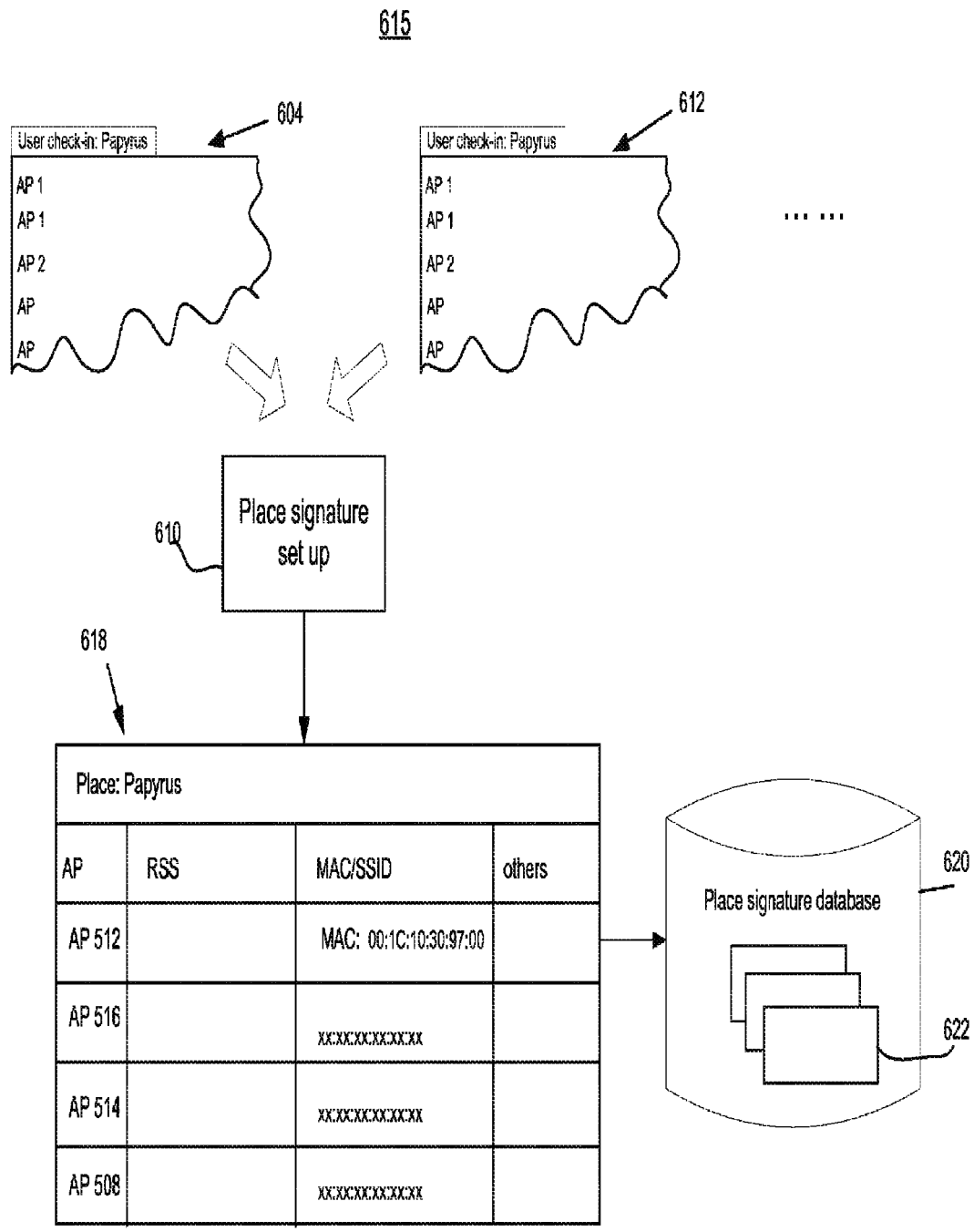

FIG. 6C illustrates an exemplary scenario 615 in accordance with aspects of the invention. The venue signature set up system may accumulate an enough amount of Wi-Fi data, including data 604 and 612, over a period of time. The amount of Wi-Fi data needed to build an initial signature may depend on various factors, such as the size of a place. Generally, the place signature set up system continually collects Wi-Fi data to maintain and update place signatures to accommodate changes over the time, such as business changes, updated Wi-Fi access points, etc. Signature updating may be performed in various appropriate ways, for instance, periodically or when the difference between the signature and the collected Wi-Fi data pattern reaches a certain threshold that a new pattern from the collected data emerges.

Based on the collected access point identifiers and RSS, the system may select certain access points to obtain a suitable feature for a venue. For example, signature 618 for venue 502 may include Wi-Fi data from access point 508, 512, 514 and 516. Since the signal strength associated with the same access point may be different in the sets of data collected at different locations, the signature may also incorporate signal strength ranges of the representative access points. A signature may be built to incorporate the variations of RF data within the boundary of a venue, so the system may detect the users are at the same place when they are at different locations of the venue.

Other information may also be utilized by the venue signature set up system and be included in the signature. For example, different weights may be given to different access points in the signature. For another example, time stamps may be associated with the collected Wi-Fi data so the signature may be made proof to the Wi-Fi changes in time dimension, due to, e.g., broken-down antenna and temporary erected clutter, etc. Generally, the RF features of a venue should vary in space to differentiate different places and stay relatively constant in time. The place signature set up system may make use of various types of learning systems and methods to adapt to the RF environment changes.

When a signature has been built, it is added to a place signature database, such as database 620 that stores signature data 622 for various places. The place signature database may also store place-related information, or be linked to other databases that hold such information. The information includes but is not limited to, place geolocations, business information, special activities such as sales or coupon offers, news updates, reviews, etc. Aspects of the invention thus enable a unique RF signal pattern to be built for each place without dedicated field surveys or drive tests, but by using data contributed by users performing location check-in and Wi-Fi data sent by user devices upon the location check-in.

A location may be associated with different layers of places. For example, locations 518 is both associated with place 502 (store "papyrus") and place 501 ("Mall at Long Hills"). Users at location 518 may perform location check-in to place 501 as well as to place 502. Thus, a signature for place 501 may be built from the RF data transmitted by user devices within place 502 and the check-in data for venue 501. In this situation, the representative RF data (Wi-Fi identifiers and RSS) for venue 501 may be gathered and selected by the system from data transmitted at different venues within venue 501. A signature for place 502 may also be built from the RF data transmitted by user devices within place 502, but with the check-in data for place 502.

Figure 7:
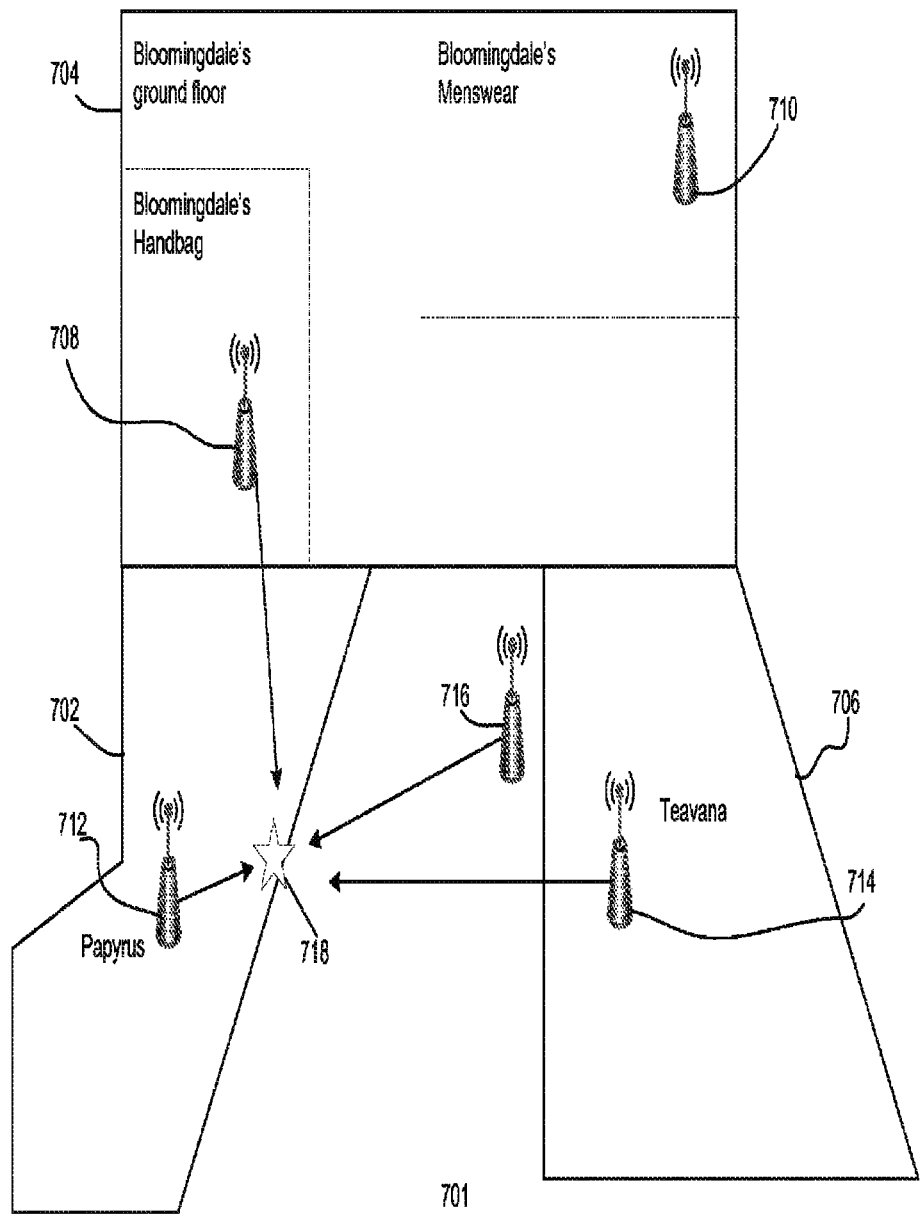
FIG. 7 is an exemplary scenario in accordance with aspects of the invention.

FIG. 7 illustrates an exemplary scenario 700 of detecting a place in accordance with aspects of the invention. In this scenario, signatures for places 702, 704 and 706 have been built. Thus, when a user device comes within one of these places or a close vicinity of a place, the system automatically finds a place signature that matches the Wi-Fi data transmitted by the device. The user device may thus be presented with the matched venue information and options to check-in (the user device may also be automatically checked in). Based on the matched result, the system and/or other location-based service may also perform automatic check-in, retrieving venue-related information, presenting the information on the user device, and any other venue-based services. Aspects of the invention allow location check-in and other location-based services using Wi-Fi data in the absence of GPS signals or for devices without GPS capabilities.

Figure 8:
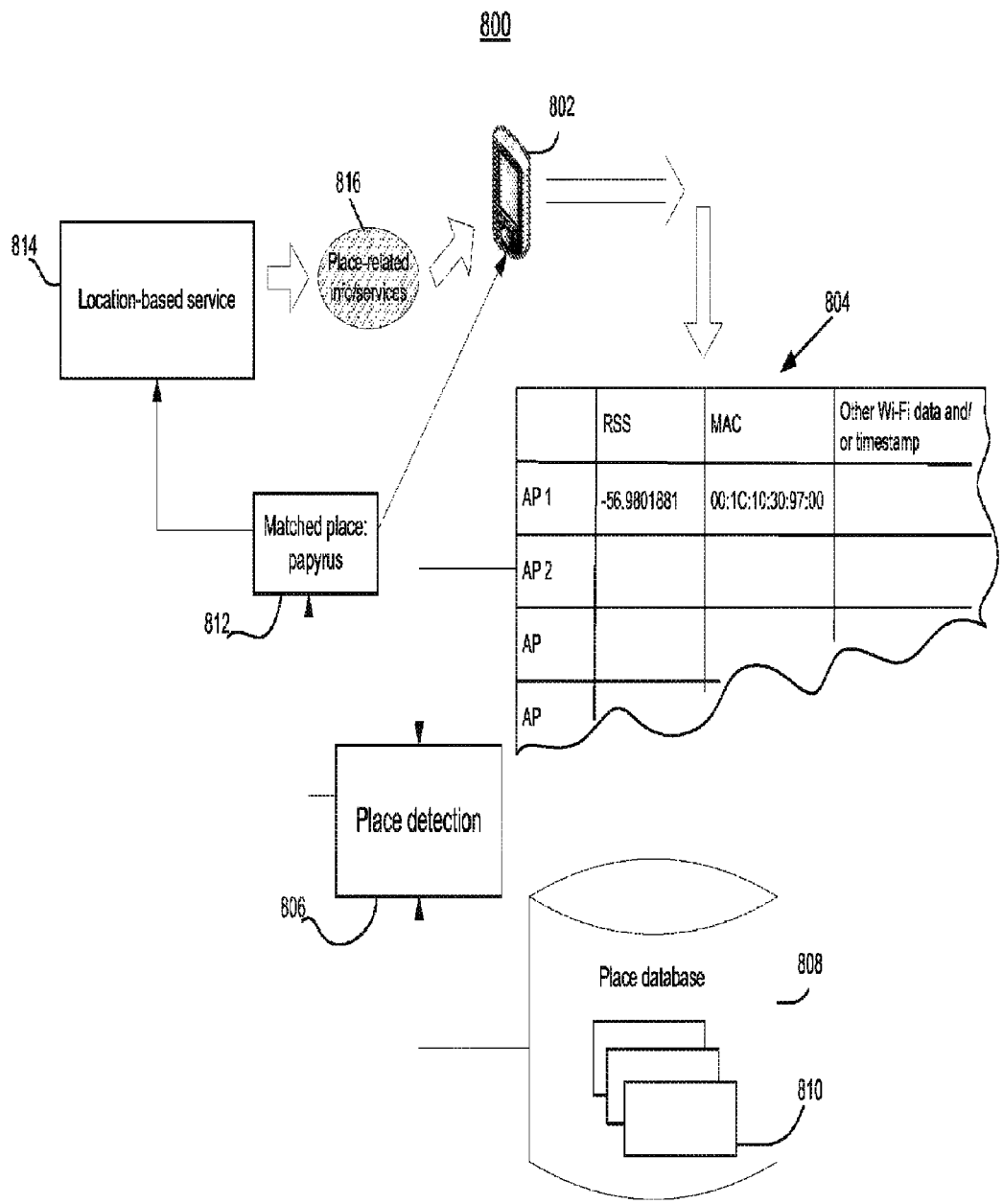
FIG. 8 is a function diagram in accordance with the scenario in FIG. 7.

As shown in FIG. 7, signals from access points 708, 712, 714 and 716 may reach location 718. Thus, in FIG. 8, which illustrates an exemplary operating diagram in accordance with scenario 700, a user device 802 at location 718 may detect these access points and transmit to venue detection system 806 the Wi-Fi data 804 that includes the detected access point identifiers and signal strength.

Based on the received data and venue signatures 810 from venue database 808, the system performs venue matching and other related operations. Matching may be performed in various ways based on various criteria. For example, the system compares the access point identifiers from the received Wi-Fi data with the access point identifiers in the signatures. The system also compares the signal strength with the signal strength for the same access point in the signatures.

When a high confidence exists between the received Wi-Fi data and one of the venue signatures (e.g., by calculating the overlapping MAC addresses and the signal strength information), or the confidence level passes a predetermined threshold or the received Wi-Fi data has a pattern similar to one of the signatures, the system determines the user device is within the matched place. In scenario 800, the closest match to Wi-Fi data 804 is signature 812 for place "Papyrus". Then, the matched venue is sent to the user device.

Upon receiving the matched place, the user of device 802 may perform a location check-in through location-based application 814 (e.g., Google Buzz). This application may also perform automatic check-in for the user if the user's configuration of the application allows so. After the check-in, the posts, reviews, comments and other information posted by the user through these applications may be linked to this place and be shared with other users of the application. For example, a user may post a Google Buzz post or a review about her experience at place 702 and other users are able to view the posts in content related to place 702. The matched place may also be pushed to the user's friends as a status update of the user's present location. Information that is relevant to the matched place (e.g., newly arrived products, special offers, etc.) may also be retrieved from place database 808 or from other external database and be sent to the user device. The matched result may be used by various types of applications and services to provide place-aware services or information 816 to the user device.

Although the system in scenario 800 obtains a single best matched venue for user device 802 at location 718 and transmits the detected venue to the device, there may be scenarios where the system determines that multiple places may be possible best matches. In this situation, the system may send a list of best matches to the user device and the user may choose from the list. The user device may then present the list of these most possible venues to the user.

As discussed above, a particular location may be associated with different layers of places, therefore the place detection system may match the received RF data to layers of places and present these places to the user devices. For example, system 806 may match Wi-Fi data 804 not only to the signature of place 702, but also to the signature of place 701 where place 702 resides.

Figure 9:
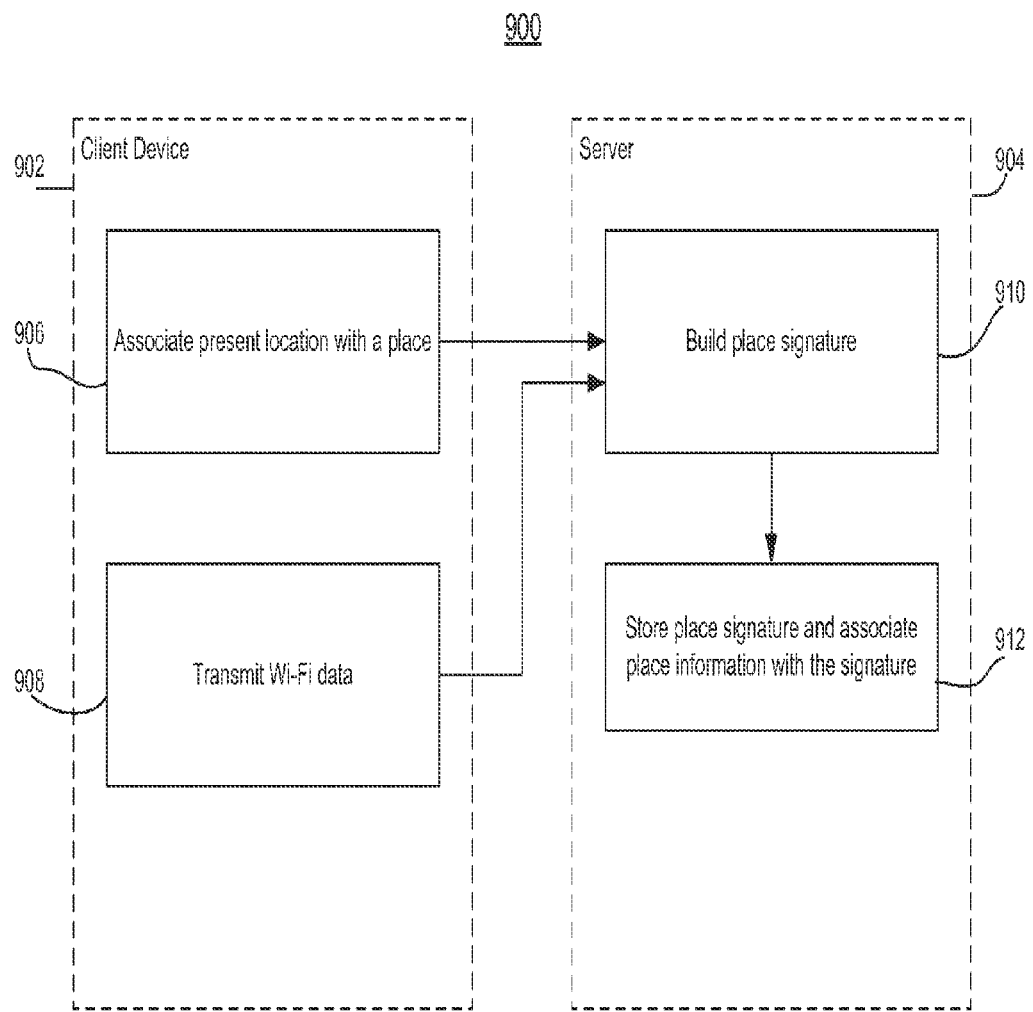
FIG. 9 is a flowchart in accordance with aspects of the invention.

FIG. 9 depicts a flow diagram 900 for a place signature set up process in accordance with aspects of the invention. It should be understood that the operations do not have to be performed in the precise order described below. Rather, various steps can be handled in a different order or simultaneously.

In one example, the process may start with block 906, where client device 902 performs a location check-in through a check-in application or any other type of operations that associate the present location of the device with the place where the device is located at. The check-in data is transmitted to server 904. In block 908, the client device may automatically transmit, or transmit upon request, detected access point signals to the server. Wi-Fi data transmission and check-in data may be performed at the same time. In block 910, using the data transmitted from client device 902 as well as data collected from other client devices, the server builds signatures for the venue that the user device checked in, and in block 912 may store the signatures in a venue database and may further associate various types of place-related information with the venue.

Figure 10:
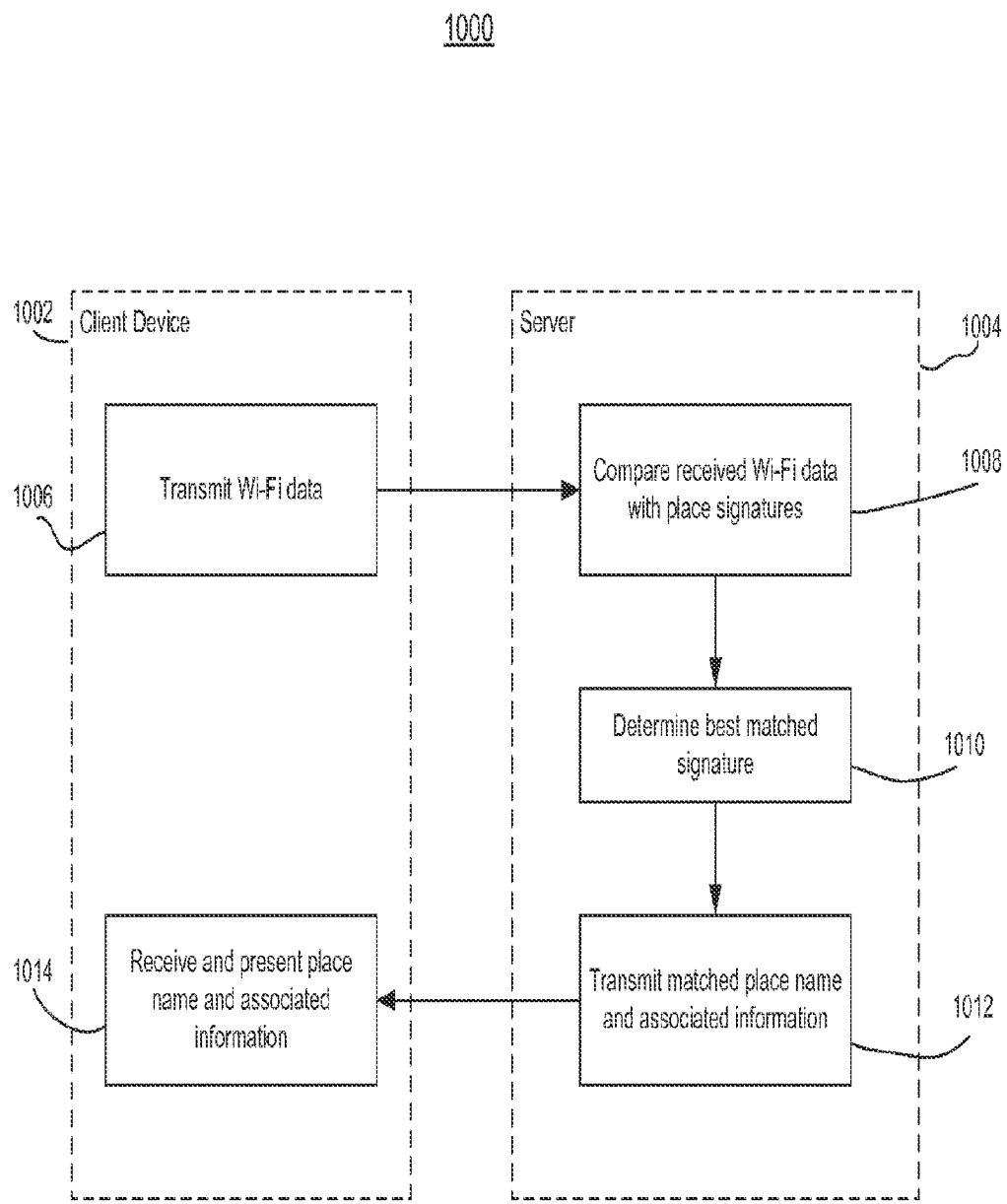
FIG. 10 is a flowchart in accordance with aspects of the invention.

FIG. 10 depicts a flow diagram for a venue detection process 1000 in accordance with aspects of the invention. It should also be understood that the operations do not have to be performed in the following order. Instead, various steps can be handled in a different order or simultaneously.

In block 1006, client device 1002 at a particular location may transmit a set of RF data to server 1004. Then, in block 1008, the server may compare the received data with the signatures in a venue database and in block 1010 obtain one or more signatures that are most similar to the received RF data. The in block 1012, the server may transmit the matched venue name back to the client device. Venue-based information may also be transmitted in this step. Upon receiving the matched result and related information in block 1014, the client device may present the received information through the output system of the client device.

Systems and methods in this invention are not limited to Wi-Fi access points, but may be used with any device that transmits a wireless signal in accordance with present or future wireless standards, e.g., cellular towers and/or base stations in 3G or 4G networks, or ad-hoc type networks such as those comprising Bluetooth-enabled devices, or any combination of the signal data transmitted by various types of signal sources.

It will be further understood that the sample values, types and configurations of data described and shown in the figures are for the purposes of illustration only. In that regard, systems and methods in accordance with aspects of the invention may include various types of networks, transmission devices, user devices, servers, data values, data types and configurations, and different methods and systems for collecting RF data and selecting appropriate RF features to distinguish different places. The systems and methods may be provided and received at different times (e.g., via different servers or databases) and by different entities (e.g., some values may be pre-suggested or provided from different sources). Operations described as being performed on server and data being processed on server may be performed and processed on the user device, and vice versa.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Unless expressly stated to the contrary, every feature in a given embodiment, alternative or example may be used in any other embodiment, alternative or example herein. For instance, any location check-in application or other method to associate a location with a user device may be used. Various ways of building up signatures for places and determining the confidence level between the received RF data and the venue signatures may be used in any configuration herein. Similarly, various ways of selecting one or more most correlated signatures may be adopted. Any mobile client evice may be used with any of the configurations herein.

What is claimed is:

1. A method of detecting a place, comprising:
receiving, from a client device, a set of data transmitted by at least one wireless transmission station and detected by the client device, the set of data comprising identifiers of the at least one wireless transmission station and signal strength information of wireless signals transmitted by the at least one wireless transmission station;
comparing the set of data with a plurality of signatures, each signature being associated with a respective place and indicating a wireless signal pattern of the respective place, each signature comprising information about the respective place, identifiers of wireless transmission stations and signal strength information of signals transmitted by the wireless transmission stations;
selecting a signature based on the comparison; and
providing to enable the client device to check in at the place associated with the selected signature, based on the information about the place.

2. The method of claim 1, wherein the information about the place comprises name information of the place.

3. The method of claim 1, wherein providing to enable the client device to check in at the place enables the client device to automatically check in at the place.

4. The method of claim 1, wherein providing to enable the client device to check in at the place enables a user of the client device to optionally check in at the place.

5. The method of claim 1, wherein comparing the set of data with the plurality of signatures comprises:
comparing the identifiers in the set of data with the identifiers in respective ones of the plurality of signatures; and
comparing the signal strength information in the set of data with the signal strength information in respective ones of the plurality of signatures.

6. The method of claim 1, wherein selecting a signature based on the comparison comprises selecting a signature where its indicated wireless signal pattern correlates to the received set of data.

7. An apparatus for detecting a place, comprising:
a processor in communication with a client device and configured to process information received from the client device and information to be sent to the client device;
a memory coupled to the processor, the memory storing instructions executable by the processor, the instructions comprising:
receiving, from the client device when the client device is at the place, a set of data transmitted by at least one wireless transmission station and detected by the client device, the set of data comprising identifiers of the at least one wireless transmission station and signal strength information of wireless signals transmitted by the at least one wireless transmission station;
comparing the set of data with a plurality of signatures, each signature being associated with a respective place and indicating a wireless signal pattern of the respective place, each signature comprising information about the respective place, identifiers of wireless transmission stations and signal strength information of signals transmitted by the wireless transmission stations, wherein the information about the respective place comprises name information of the respective place;
selecting a signature based on the comparison; and
providing to enable the client device to check in at the place associated with the selected signature, based on the information about the place.

8. The apparatus of claim 7, wherein providing to enable the client device to check in at the place enables the client device to automatically check in at the place.

9. The apparatus of claim 7, wherein providing to enable the client device to check in at the place enables a user of the client device to optionally check in at the place.

10. The apparatus of claim 7, wherein comparing the set of data with the plurality of signatures comprises:
comparing the identifiers in the set of data with the identifiers in respective ones of the plurality of signatures; and
comparing the signal strength information in the set of data with the signal strength information in respective ones of the plurality of signatures.

11. The apparatus of claim 7, wherein selecting a signature based on the comparison comprises selecting a signature where its indicated wireless signal pattern correlates to the received set of data.

12. A method of detecting a place, comprising:
receiving, from a client device, a set of data transmitted by at least one wireless transmission station and detected by the client device, the set of data comprising identifiers of the at least one wireless transmission station and signal strength information of wireless signals transmitted by the at least one wireless transmission station;
comparing the set of data with a plurality of signatures, each signature being associated with a respective place and indicating a wireless signal pattern of the respective place, each signature comprising information about the respective place, identifiers of wireless transmission stations and signal strength information of signals transmitted by the wireless transmission stations;
selecting a signature based on the comparison; and
providing at least one advertisement to the client device based on the information about the place associated with the selected signature, wherein the at least one advertisement is associated with the place.

13. The method of claim 12, wherein the information about the place comprises name information of the place.

14. The method of claim 12, wherein the at least one advertisement comprises a coupon associated with the place.

15. The method of claim 12, wherein the at least one advertisement comprises sales activities associated with the place.

16. The method of claim 12, wherein comparing the set of data with the plurality of signatures comprises:
comparing the identifiers in the set of data with the identifiers in respective ones of the plurality of signatures; and
comparing the signal strength information in the set of data with the signal strength information in respective ones of the plurality of signatures.

17. The method of claim 12, wherein selecting a signature based on the comparison comprises selecting a signature where its indicated wireless signal pattern correlates to the received set of data.

18. An apparatus for detecting a place, comprising:
a processor in communication with a client device and configured to process information received from the client device and information to be sent to the client device;
a memory coupled to the processor, the memory storing instructions executable by the processor, the instructions comprising:
receiving, from the client device when the client device is at the place, a set of data transmitted by at least one wireless transmission station and detected by the client device, the set of data comprising identifiers of the at least one wireless transmission station and signal strength information of wireless signals transmitted by the at least one wireless transmission station;

compared the set of data with a plurality of signatures, each signature being associated with a respective place and indicating a wireless signal pattern of the respective place, each signature comprising information about the respective place, identifiers of wireless transmission stations and signal strength information of signals transmitted by the wireless transmission stations, wherein the information about the respective place comprises name information of the respective place;

selecting a signature based on the comparison; and providing at least one advertisement to the client device based on the information about the place associated with the selected signature, wherein the at least one advertisement is associated with the place.

19. The apparatus of claim 18, wherein the at least one advertisement comprises a coupon associated with the place.

20. The apparatus of claim 18, wherein the at least one advertisement comprises sales activities associated with the place.

\* \* \* \* \*